United States Patent
Lin et al.

(10) Patent No.: US 9,023,463 B2
(45) Date of Patent: May 5, 2015

(54) POLYMER INTERLAYERS COMPRISING ANTIBLOCKING LAYERS

(71) Applicant: Solutia Inc., St. Louis, MO (US)

(72) Inventors: Chiah-chang Clifford Lin, Longmeadow, MA (US); Ping Yuan, Amherst, MA (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 14/084,516

(22) Filed: Nov. 19, 2013

(65) Prior Publication Data

US 2014/0079928 A1 Mar. 20, 2014

Related U.S. Application Data

(63) Continuation of application No. 11/087,985, filed on Mar. 24, 2005, now abandoned.

(51) Int. Cl.
| | |
|---|---|
| B32B 7/02 | (2006.01) |
| B32B 7/12 | (2006.01) |
| B32B 17/10 | (2006.01) |
| B32B 27/08 | (2006.01) |
| B32B 27/18 | (2006.01) |
| B32B 27/30 | (2006.01) |
| C08K 5/20 | (2006.01) |
| C08L 29/14 | (2006.01) |
| B32B 27/20 | (2006.01) |
| B32B 27/42 | (2006.01) |

(52) U.S. Cl.
CPC .......... *B32B 27/20* (2013.01); *Y10T 428/24967* (2015.01); *Y10T 428/269* (2015.01); *B32B 2329/06* (2013.01); *B32B 27/18* (2013.01); *B32B 27/30* (2013.01); *B32B 2250/03* (2013.01); *B32B 17/1055* (2013.01); *B32B 2250/246* (2013.01); *B32B 7/12* (2013.01); *B32B 7/02* (2013.01); *B32B 2250/02* (2013.01); *C08L 29/14* (2013.01); *C08L 2666/36* (2013.01); *Y10T 428/24942* (2015.01); *B32B 17/10761* (2013.01); *B32B 17/10935* (2013.01); *B32B 27/08* (2013.01); *B32B 27/42* (2013.01); *B32B 2250/24* (2013.01); *B32B 2264/0264* (2013.01); *B32B 2307/412* (2013.01); *B32B 2307/558* (2013.01); *B32B 2307/746* (2013.01); *B32B 2605/006* (2013.01); *B32B 2607/00* (2013.01); *C08K 5/20* (2013.01)

(58) Field of Classification Search
None
See application file for complete search history.

(56) References Cited

U.S. PATENT DOCUMENTS

| | | | | |
|---|---|---|---|---|
| 3,361,699 | A | * | 1/1968 | Mattimoe et al. ............. 524/317 |
| 3,645,822 | A | | 2/1972 | Widiger et al. |
| 4,287,107 | A | | 9/1981 | Hermann et al. |
| 4,419,410 | A | * | 12/1983 | Weiner .......................... 428/516 |
| 4,533,509 | A | | 8/1985 | Gust et al. |
| 4,590,124 | A | | 5/1986 | Schoenberg |

(Continued)

FOREIGN PATENT DOCUMENTS

| | | | |
|---|---|---|---|
| DE | 100 64 373 | A1 | 6/2002 |
| DE | 10064373 | * | 6/2002 |

(Continued)

*Primary Examiner* — Vivian Chen
(74) *Attorney, Agent, or Firm* — Michelle Bugbee (57) ABSTRACT

The present invention is in the field of polymer interlayers used in multiple layer glass panels, and specifically the present invention is in the field of antiblocking agents for polymer interlayers and methods of effectively incorporating such agents into interlayers.

14 Claims, 3 Drawing Sheets

(56) References Cited

U.S. PATENT DOCUMENTS

| | | | |
|---|---|---|---|
| 4,600,655 A | 7/1986 | Hermann et al. | |
| 4,618,527 A * | 10/1986 | Doyen | 428/213 |
| 4,751,262 A | 6/1988 | McKinney et al. | |
| 4,956,232 A | 9/1990 | Balloni et al. | |
| 5,049,436 A | 9/1991 | Morgan et al. | |
| 5,077,129 A | 12/1991 | Schinkel et al. | |
| 5,118,540 A | 6/1992 | Hutchison | |
| 5,427,842 A | 6/1995 | Bland et al. | |
| 5,547,736 A * | 8/1996 | Simon et al. | 428/143 |
| 5,558,930 A | 9/1996 | DiPoto | |
| 5,573,842 A | 11/1996 | Gutweiler | |
| 5,595,818 A | 1/1997 | Hopfe et al. | |
| 6,159,608 A | 12/2000 | Friedman et al. | |
| 6,210,764 B1 | 4/2001 | Hayes | |
| 6,423,170 B1 | 7/2002 | Friedman et al. | |
| 6,432,522 B1 | 8/2002 | Friedman et al. | |
| 6,559,230 B2 | 5/2003 | Heck et al. | |
| 6,649,247 B2 | 11/2003 | Murschall et al. | |
| 6,797,396 B1 | 9/2004 | Liu et al. | |
| 6,825,255 B2 | 11/2004 | Yuan et al. | |
| 6,825,269 B1 | 11/2004 | Gottschall | |
| 7,125,921 B2 | 10/2006 | Yuan et al. | |
| 2002/0099145 A1 | 7/2002 | Heck et al. | |
| 2002/0196519 A1 | 12/2002 | Elkadi et al. | |
| 2003/0039814 A1 | 2/2003 | Bader et al. | |
| 2004/0004778 A1 | 1/2004 | Liu et al. | |
| 2004/0033369 A1 | 2/2004 | Fleming et al. | |
| 2004/0033675 A1 | 2/2004 | Fleming et al. | |
| 2005/0025980 A1 | 2/2005 | Agrawal et al. | |
| 2006/0216485 A1 | 9/2006 | Lin et al. | |
| 2007/0287786 A1 | 12/2007 | Yuan | |
| 2008/0047655 A1 | 2/2008 | Karagiannis et al. | |
| 2008/0124540 A1 | 5/2008 | Yuan | |

FOREIGN PATENT DOCUMENTS

| | | | |
|---|---|---|---|
| EP | 0 010 718 A1 | | 5/1980 |
| EP | 0 635 538 A2 | | 1/1995 |
| JP | 05-085782 | | 4/1993 |
| JP | 05-138840 | | 6/1993 |
| JP | 2003-238217 | * | 8/2003 |
| JP | 2003 238217 A | | 8/2003 |
| JP | 2004-123423 | * | 4/2004 |
| JP | 2004 123423 A | | 4/2004 |
| WO | WO 99/32284 | | 7/1999 |
| WO | WO 01/00407 A1 | | 1/2001 |
| WO | WO 2004/099304 | * | 11/2004 |
| WO | WO 2004/099304 A2 | | 11/2004 |
| WO | WO 2004/111116 A1 | | 12/2004 |

* cited by examiner

POLYMER INTERLAYERS COMPRISING ANTIBLOCKING LAYERS

CROSS REFERENCE TO RELATED APPLICATION

This application is a continuation of U.S. application Ser. No. 11/087,985 filed Mar. 24, 2005, abandoned, the disclosure of which is incorporated herein by reference in its entirety.

FIELD OF THE INVENTION

The present invention is in the field of polymer interlayers used in multiple layer glass panels, and specifically the present invention is in the field of antiblocking agents for polymer interlayers and methods of effectively incorporating such agents into interlayers.

BACKGROUND

Poly(vinyl butyral) (PVB) is commonly used in the manufacture of polymer sheets that can be used as interlayers in light-transmitting laminates such as safety glass or polymeric laminates. Safety glass typically refers to a transparent laminate comprising a poly(vinyl butyral) sheet disposed between two panes of glass. Safety glass often is used to provide a transparent barrier in architectural and automotive openings. Its main function is to absorb energy, such as that caused by a blow from an object, without allowing penetration through the opening.

Poly(vinyl butyral) is commonly produced through, for example, extrusion processes. Extrusion results in the formation of a continuous sheet of poly(vinyl butyral). Typically, this sheet is rolled for storage and shipping. The sheet can also be cut and stacked for storage and shipping.

Poly(vinyl butyral) sheet, whether in roll form or in stacked form, can tend to stick to itself or "block" at temperatures that can be encountered before and during the laminating process. This blocking is generally not desirable, and can lead to increased production costs.

Conventional attempts to enhance the blocking resistance of poly(vinyl butyral) sheets include mechanical roughing of the sheet surfaces (for example, embossing), applying a powder such as sodium bicarbonate to the sheet surfaces in contact with each other, and chemically treating the surfaces of the poly(vinyl butyral) sheeting, among others. Such surface treatments can, however, often create undesirable handling or adhesion properties, and are often difficult and/or expensive to implement.

In other conventional methods used to prevent blocking, poly(vinyl butyral) sheeting can be interleaved with another sheet material, such as polyethylene, or can be stored and transported under refrigeration, for example at temperatures from about 5° C. to about 15° C. For some compositions of poly(vinyl butyral) sheeting, however, such as poly(vinyl butyral) sheeting having relatively high plasticizer content, these anti-blocking techniques may not produce optimal results.

Another technique for preventing blocking entails incorporating anti-blocking materials directly into the poly(vinyl butyral). Incorporation of such materials into the poly(vinyl butyral), however, can adversely affect the optical properties of the resulting laminate or the adhesive properties of the finished poly(vinyl butyral).

Accordingly, further improved compositions and methods are needed to enhance the blocking resistance of polymer sheets, and specifically poly(vinyl butyral) sheets, without adversely affecting the optical clarity of the finished laminates of the glass or adhesion properties of the resulting poly(vinyl butyral) sheet to glass.

SUMMARY OF THE INVENTION

It has now been surprisingly discovered, according to the present invention, that the use of an additional antiblocking polymer sheet on a conventional polymer sheet or the formation of an antiblocking region in a polymer sheet allows the production of interlayers that resist blocking without having the undesirable characteristics that often occur with the use of antiblocking agents that are distributed in bulk throughout a polymer sheet.

The present invention includes an interlayer, comprising: a polymer stack comprising a first polymer sheet, wherein said first polymer sheet is substantially free of antiblocking agent; and, a second polymer sheet disposed in contact with said polymer stack, wherein said second polymer sheet comprises an antiblocking agent and has a thickness of less than 0.4 millimeters.

The present invention includes an interlayer, comprising: a polymer sheet, wherein said polymer sheet comprises an antiblocking region and a non antiblocking region, wherein said antiblocking region comprises an antiblocking agent and has a thickness of less than 0.4 millimeters, and said non antiblocking region is substantially free of antiblocking agents.

The present invention includes a method for making a polymer sheet, comprising: coextruding a first melt and a second melt to form said polymer sheet, wherein said polymer sheet comprises an antiblocking region formed from said first melt and a non antiblocking region formed from said second melt, wherein said antiblocking region has a thickness of less than 0.4 millimeters, wherein said first melt comprises an antiblocking agent, and wherein said second melt is substantially free of antiblocking agent.

The present invention includes a method for making an interlayer, comprising: providing a polymer stack, wherein said polymer stack comprises a first polymer sheet, wherein said first polymer sheet is substantially free of antiblocking agent; disposing a second polymer sheet in contact with said polymer stack, wherein said second polymer sheet comprises an antiblocking agent and has a thickness of less than 0.4 millimeters; and, laminating said polymer stack and said second polymer sheet to form an interlayer.

DETAILED DESCRIPTION

The present invention is directed to interlayers that can be used in multiple layer laminated glass constructs such as those used in architectural applications and automotive windshield applications. Interlayers of the present invention incorporate a relatively thin antiblocking polymer sheet, or in some embodiments an antiblocking region within a polymer sheet, to provide antiblocking character to the interlayer without the necessity of adding antiblocking agents to the entire interlayer.

Figure 1:
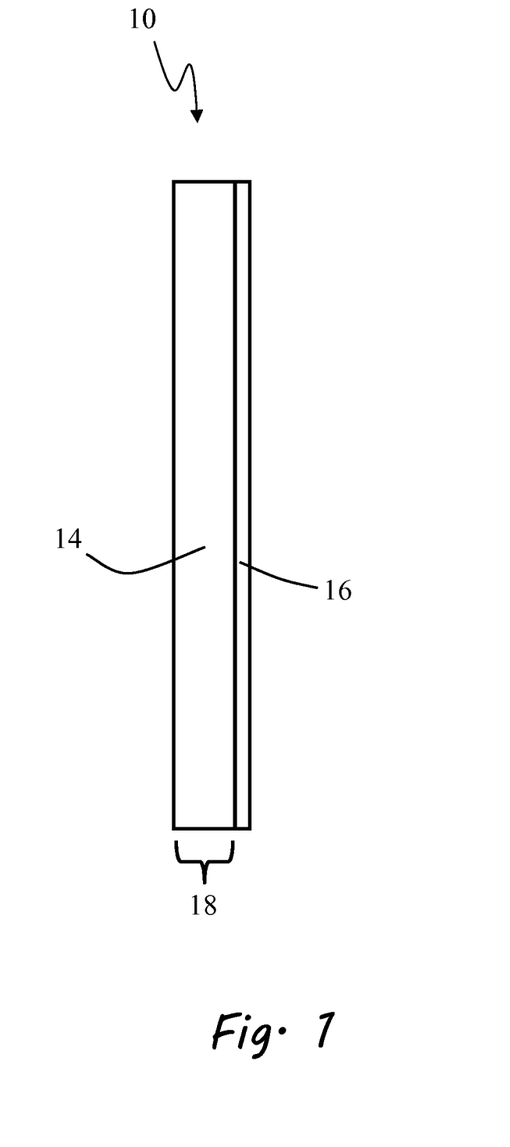
FIG. 1 represents a schematic cross sectional view of one embodiment of the present invention having an antiblocking layer.

As shown in FIG. 1, various embodiments of the present invention comprise a polymer stack 18 comprising a first polymer sheet 14 disposed in contact with a second polymer sheet 16 to form an interlayer 10. As will be described in detail below, the polymer sheets can comprise any suitable polymeric material, such as poly(vinyl butyral). As used herein, a "polymer stack" means one or more layers of polymeric materials, and optionally other layers, that are disposed in contact with one another to form a stack, wherein at least one of the layers is a polymer sheet. A polymer stack can be, as shown in FIG. 1, a single polymer sheet, or, in other embodiments, a polymer stack can comprise two or more layers of polymer sheets and polymer films (described elsewhere herein), among other types of layers.

The second polymer sheet 16 comprises one or more antiblocking agents and, in various embodiments, has a thickness of less than 0.4 millimeters, 0.3 millimeters, or 0.25 millimeters. The first polymer sheet 14 can be any suitable thickness so that, in combination with the other layers of the polymer stack 18, if any, an interlayer 10 is formed that is of the desired thickness. The total interlayer thickness can be, for example about 1.5 millimeters. The first polymer sheet 14 can contain, for example, no antiblocking agents, or can be substantially free of antiblocking agents. In various embodiments, the first polymer sheet has less than 10%, less than 5%, or less than 1% of the antiblock agent of the second polymer sheet, on a weight per weight basis.

In the configuration shown in FIG. 1, an interlayer of the present invention provides a construct that allows for the concentration of antiblocking agents on an outside surface of an interlayer rather than the conventional distribution of an antiblocking agent throughout an interlayer. For example, a single polymer sheet interlayer can, conventionally, have antiblocking agents distributed throughout the sheet. Because only the antiblocking agents on the outside surface of the sheet can affect the antiblocking character of the sheet, however, the antiblocking agents that are distributed throughout the interior of the single polymer sheet interlayer do not add to the antiblocking character of the sheet but will often degrade the optical clarity and performance of the sheet. By limiting the antiblocking agent to a relatively thin layer that is disposed on the outside of a polymer stack, the antiblocking effect produced can be maximized without detrimentally affecting optical quality.

Figure 2:
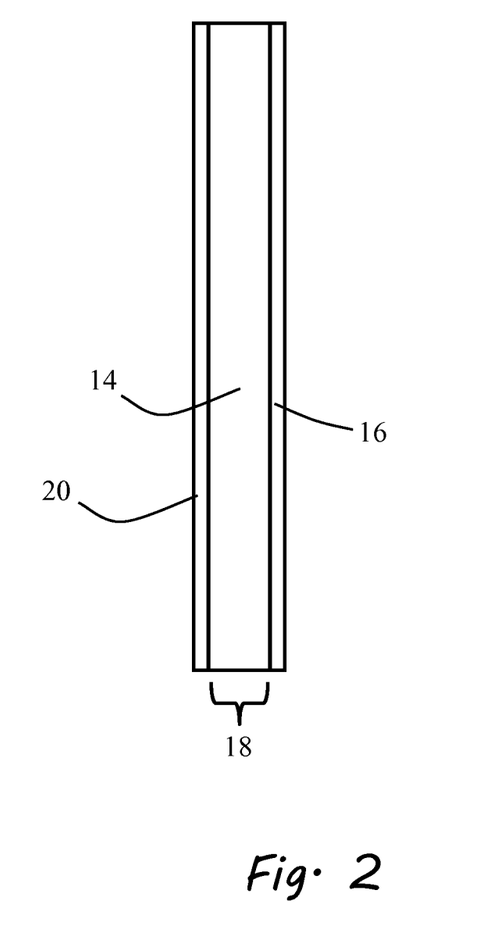
FIG. 2 represents a schematic cross sectional view of one embodiment of the present invention having two antiblocking layers.

It will be seen by those of ordinary skill in the art that the configuration shown in FIG. 1 can be used to provide an antiblocking benefit because stacks or rolls of the interlayer can be formed so as to always place the second polymer sheet 16 in contact with the exposed surface of the polymer stack 18. In various embodiments, however, further antiblocking protection will be desired. As shown in FIG. 2, various embodiments of the present invention utilize a third polymer sheet 20 disposed in contact with the polymer stack 18, which again, for simplicity, is shown as comprising only a single polymer sheet 14. As above, however, the polymer stack 18 can comprise multiple polymeric layers and/or other layers. In these embodiments, the third polymer sheet 20 can be the same as the second polymer sheet 16, or it can be different. The third polymer sheet 20 can have the same compositions and range of thicknesses as the second polymer sheet 16, as given above.

Although the polymer stack 18 in any of the above embodiments can comprise no or substantially no antiblocking agents, in various embodiments any of the polymer sheet layers in the polymer stack 18 can comprise intentionally added antiblocking agent in a lesser concentration than is found in the second or third polymer sheets 16, 20. In addition to the intentional addition of antiblocking agents to one or more polymer sheets within the polymer stack 18, it is expected that some antiblocking agent, after lamination of the interlayer, can migrate from the second or third polymer sheets 16, 20 into the first polymer sheet 14 and/or any other polymer sheets in the polymer stack 18. This generally results in an insubstantial amount of antiblocking agent in the polymer stack 18.

For the above described embodiments, as shown in FIGS. 1 and 2, the polymer stack 18 can comprise any conventional configuration of layers. For example, and without limitation, the polymer stack 18 can have the following configurations, where n represents 1 to 10 iterations, and preferably 1, 2, or 3 iterations:

(polymer sheet)$_n$
(polymer sheet//polymer film)$_n$
(polymer film//polymer sheet$_n$
(polymer sheet//polymer film//polymer sheet)$_n$
(polymer film//polymer sheet//polymer film)$_n$ Of course, many other arrangements are possible and within the scope of the present invention, which includes embodiments incorporating the second polymer sheet 16 or the second and third polymer sheets 16, 20 into any suitable polymer stack 18.

Figure 3:
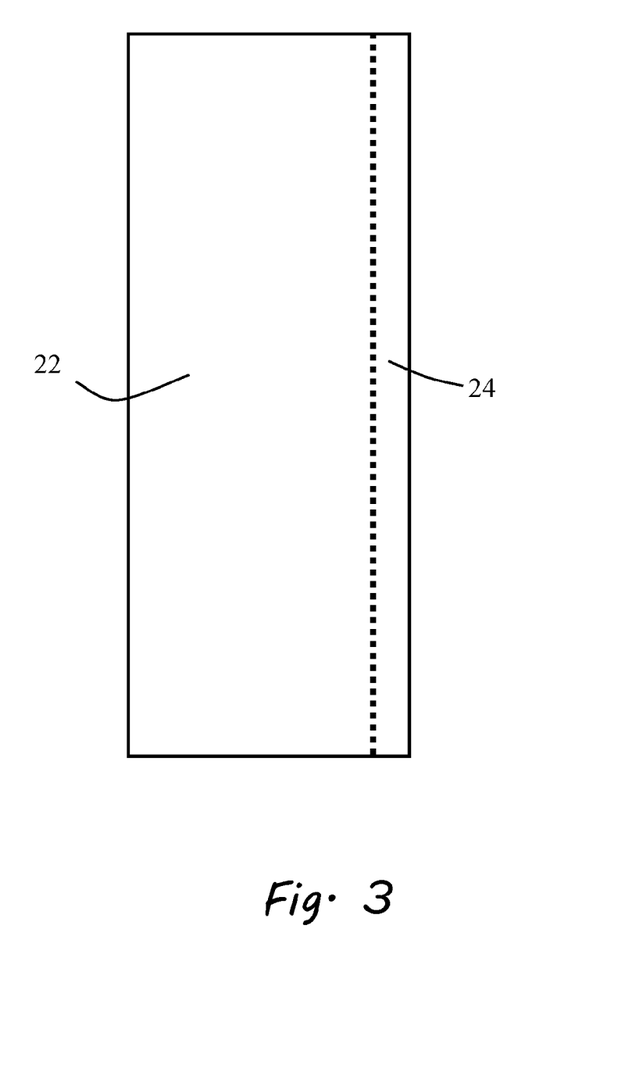
FIG. 3 represents a schematic cross sectional view of one embodiment of the present invention having an antiblocking region.

In addition to providing relatively thin polymer sheet antiblocking layers, the present invention also includes polymer sheets that comprise a relatively thin antiblocking region within the sheet and adjacent an exposed surface. As shown in FIG. 3, a polymer sheet having an antiblocking region 24 and a non antiblocking region 22 can be produced, wherein the antiblocking region comprises one or more antiblocking agents. Such a sheet can be produced, for example, by coextruding two polymer melts, as described elsewhere herein. The resulting polymer sheet effectively provides a similar antiblocking effect as the multiple layer interlayer shown in FIG. 1 by concentrating antiblocking agents in a relatively narrow region where the agents can be effectively used to prevent blocking.

For the embodiment shown in FIG. 3, the antiblocking region 24 is formed so as to emulate a separate layer within the polymer sheet, and can have a thickness of less than 0.4 millimeters, less than 0.3 millimeters, less than 0.25 millimeters, less than 0.2 millimeters, or less than 0.15 millimeters. The non antiblocking region 22 can have any suitable thickness as desired to form a polymer sheet of the appropriate thickness for any given application. Further, the non antiblocking region can comprise an amount of antiblocking agent that is less than the amount in the antiblocking region, or can have no antiblocking agent or be substantially free of antiblocking agent, wherein any antiblocking agent that migrates into the non antiblocking region 22 from the antiblocking region 24 is generally insubstantial. In various embodiments, the non antiblocking region 22 has less than 10%, less than 5%, or less than 1% of the antiblock agent of the antiblocking region 24, on a weight per weight basis.

The interlayer shown in FIG. 3, as will be understood by one of skill in the art, can be rolled or stacked with reduced blocking, and, if desired, used alone as an interlayer in a multiple layer glass panel. In further embodiments, the polymer sheet shown in FIG. 3 can be used as a single layer in a multiple layer interlayer. For example, a polymer film can be disposed between two of the polymer sheets, with the antiblocking regions facing out, to form a three layer interlayer having an antiblocking region on each exposed surface.

In further embodiments of the present invention, three separate regions are formed in a polymer sheet, for example by coextruding three polymer melts. In these embodiments, a second antiblocking region is formed in the polymer sheet on the face of the polymer sheet opposite the antiblocking region 24 shown in FIG. 3 to form a single polymer sheet having three regions that emulate the layout of the embodiments shown in FIG. 2, wherein a central non antiblocking region is disposed between two antiblocking regions. In these embodiments, the two antiblocking regions can be the same or different—i.e. both antiblocking regions can have the thicknesses and characteristics described above for the antiblocking region 24. These embodiments provide a single polymer sheet that has antiblocking agents concentrated at the surfaces of the sheet, which provides antiblocking character without also causing unacceptable optical effects.

In the coextrusion embodiments described herein, the non antiblocking region 22 can vary in thickness from relatively thick, for example, 1 millimeter, to very thin, for example, 0.125 millimeters. In various embodiments, the non antiblocking region 22 is less than 0.2 millimeters or 0.15 millimeters, and one or both antiblocking regions 24 have a thickness of between 0.3 and 0.5 millimeters or 0.35 and 0.45 millimeters.

Any of the embodiments described above and depicted in FIGS. 1, 2, and 3 can be used as interlayers, or, in various embodiments, combined with conventional layers to produce multiple layered interlayers. In particular, embodiments in which a single polymer sheet or region comprising antiblocking agents is used can be combined with additional layers of polymer film or polymer sheet, as desired, among other types of layers.

In various embodiments of the present invention, an interlayer can be formed that comprises a polymer stack//antiblocking polymer sheet such as that shown in FIG. 1 and a polymer sheet with an antiblocking polymer region such as that shown in FIG. 3.

Antiblocking Agents

Antiblocking agents of the present invention that are incorporated into polymer sheets comprising an antiblocking agent or antiblocking regions of polymer sheets can be any suitable antiblocking agent, as is known in the art.

Antiblocking agents useful in the interlayer of the present invention can be added in the appropriate amount to a polymer melt prior to formation of the polymer into sheets, and can be included, for example at up to 2%, 1.5%, 1%, 0.5% or 0.1% of the melt, on a weight per weight basis.

Useful antiblocking agents include, but are not limited to, fatty acid amides with the general formula:

wherein R defines an anti-blocking segment comprising a hydrocarbon chain having about 12 to about 40 carbon atoms, and $R_1$ defines H or a hydrocarbon chain having 1 to about 40 carbon atoms. These amides include erucamide, behenamide, oleyl palmitamide, stearyl erucamide, erucyl stearamide, hydroxystearamide, oleic acid diethanolamide, stearic acid diethanolamide, poly(ethylene glycol) oleic amide, octadecanamide (hereinafter "stearamide"), and mixtures of the foregoing amides. Mono-amides are preferred. Secondary mono-amides particularly are preferred. A particularly preferred secondary mono-amide is N-oleyl palmitamide, an amide with a double bond geometry as shown:

The method of incorporating the amide antiblocking agent with the polymer sheet to impart the desired properties to the surface of the polymer sheet is not critical. Preferably, the amide antiblocking agent can be added into a melt and extruded. The agent is provided in the melt at a concentration sufficient to provide the desired performances of the antiblocking, clarity, and glass adhesion. Preferably the amide is incorporated with the polymer at a concentration of about 0.001 to about 1.0 wt %; more preferably about 0.01 to about 0.6 wt %; and most preferably about 0.1 to about 0.3 wt %. Further examples of fatty acid amides are disclosed in U.S. Pat. No. 6,825,255.

Useful antiblocking agents also include, but are not limited to, bifunctional surface modifying agents that comprise an anti-blocking segment and a compatibility segment. Exemplary embodiments of modifying agents include alkylbenzenesulfonates ($RC_6H_4SO_3M$), alkylsulfonates ($RSO_3M$), alky sulfates ($ROSO_3M$), alkylcarboxylates (RCOOM), polyalkoxycarboxylates ($R(OCH_2CH_2)_nOCH_2COOM$), and alkylphosphate esters ($ROPO_3M_2$); where M is hydrogen or a metal cation (e.g., sodium, potassium, magnesium, calcium, and the like) or an ammonium ion, R is an alkyl group, and n, the number of repeat unit, is >1.

A second type of bifunctional surface modifying agent that is useful as an antiblocking agent comprises an anti-blocking segment and a compatibility segment. The anti-blocking segment preferably comprises a polyethylene block or hydrocarbon chain block and the compatibility segment preferably comprises a poly(alkylene glycol) block.

In further embodiments, a fluorinated compound can be added to a polymer sheet to provide antiblocking properties. In yet further embodiments, antiblocking agents that are known in the art can be used, for example, as disclosed in the following German Patent Documents DE2846837, DE3429440, DE10064373, International Patent Document WO03051974, Japanese Patent Documents JP53102380, JP53024369, JP58052304, JP08188660, JP11217245 and U.S. Pat. No. 6,323,159.

In addition to antiblocking agents that are included in bulk in a melt, additional anti-blocking agents can also be disposed on the polymer sheet surface by various conventional coating technologies, including, but not limited to, spray techniques, gravure, electrostatic technology, immersion (dipping) techniques, and the like. In the spray coating process, the agent is disposed in a liquid carrier, atomized, and projected at the surface of the polymer sheet. The carrier may be aqueous, or solvent-based (e.g., organic oxygen containing solvents) and can be applied as a dispersion of fine particles. The concentration of the anti-block agent in the carrier should be sufficient to achieve the desired performances. In general, the agent is disposed in the liquid carrier preferably at a concentration of 0.1 to 15% by weight; more preferably 0.5 to 10%; most preferably 1 to 5%. In one embodiment, one side of the surface is coated with the agent. In the dipping process, the extruded polymer sheet is immersed in a dispersion carrying the anti-block agent. Once the agent is deposited on the polymer sheet, the carrier can be volatilized off, thereby leaving the anti-block agent on the surface of the polymer sheet.

In addition to the individual antiblocking agents provided above, mixtures of two or more antiblocking agents can also be used.

Polymer Sheet

The following section describes the various materials that can be used to form polymer sheets of the present invention as shown as elements 14 and 16 in FIG. 1.

As used herein, a "polymer sheet" means any thermoplastic polymer composition formed by any suitable method into a thin layer that is suitable alone, or in stacks of more than one layer, for use as an interlayer that provides adequate penetration resistance and glass retention properties to laminated glazing panels. Plasticized poly(vinyl butyral) is most commonly used to form polymer sheets.

In various embodiments of the present invention, additional polymer sheet layers can be between 0.25 to 3.0 millimeters, 0.25 to 1.0 millimeters, 0.25 to 0.5 millimeters, or 0.3 to 0.4 millimeters in thickness.

The polymer sheets of the present invention can comprise any suitable polymer, and, in a preferred embodiment, as exemplified above, the polymer sheet comprises poly(vinyl butyral). In any of the embodiments of the present invention given herein that comprise poly(vinyl butyral) as the polymeric component of the polymer sheet, another embodiment is included in which the polymer component consists of or consists essentially of poly(vinyl butyral). In these embodiments, any of the variations in additives, including plasticizers, disclosed herein can be used with the polymer sheet having a polymer consisting of or consisting essentially of poly(vinyl butyral).

In one embodiment, the polymer sheet comprises a polymer based on partially acetalized poly(vinyl alcohol)s. In another embodiment, the polymer sheet comprises a polymer selected from the group consisting of poly(vinyl butyral), polyurethane, polyvinyl chloride, poly(ethylene vinyl acetate), combinations thereof, and the like. In various embodiments, the polymer sheet comprises plasticized poly(vinyl butyral). In further embodiments the polymer sheet comprises poly(vinyl butyral) and one or more other polymers. In any of the sections herein in which preferred ranges, values, and/or methods are given specifically for poly(vinyl butyral) (for example, and without limitation, for plasticizers, component percentages, thicknesses, and characteristic-enhancing additives), those ranges also apply, where applicable, to the other polymers and polymer blends disclosed herein as useful as components in polymer sheets.

For embodiments comprising poly(vinyl butyral), the poly(vinyl butyral) can be produced by known acetalization processes that involve reacting poly(vinyl alcohol) (PVOH) with butyraldehyde in the presence of an acid catalyst, followed by neutralization of the catalyst, separation, stabilization, and drying of the resin.

In various embodiments, resin used to form the polymer sheet comprising poly(vinyl butyral) comprises 10 to 35 weight percent (wt. %) hydroxyl groups calculated as poly(vinyl alcohol), 13 to 30 wt. % hydroxyl groups calculated as poly(vinyl alcohol), or 15 to 22 wt. % hydroxyl groups calculated as poly(vinyl alcohol). The polymer sheet can also comprise less than 15 wt. % residual ester groups, 13 wt. %, 11 wt. %, 9 wt. %, 7 wt. %, 5 wt. %, or less than 3 wt. % residual ester groups calculated as polyvinyl acetate, with the balance being an acetal, preferably butyraldehyde acetal, but optionally including other acetal groups in a minor amount, e.g., a 2-ethyl hexanal group (see, for example, U.S. Pat. No. 5,137,954).

In various embodiments, the polymer sheet comprises poly(vinyl butyral) having a molecular weight at least 30,000, 40,000, 50,000, 55,000, 60,000, 65,000, 70,000, 120,000, 250,000, or at least 350,000 grams per mole (g/mole or Daltons). Small quantities of a dialdehyde or trialdehyde can also be added during the acetalization step to increase molecular weight to at least 350 g/m (see, for example, U.S. Pat. Nos. 4,902,464; 4,874,814; 4,814,529; 4,654,179). As used herein, the term "molecular weight" means the weight average molecular weight.

Various adhesion control agents can be used in polymer sheets of the present invention, including sodium acetate, potassium acetate, and magnesium salts. Magnesium salts that can be used with these embodiments of the present invention include, but are not limited to, those disclosed in U.S. Pat. No. 5,728,472, such as magnesium salicylate, magnesium nicotinate, magnesium di-(2-aminobenzoate), magnesium di-(3-hydroxy-2-napthoate), and magnesium bis(2-ethyl butyrate)(chemical abstracts number 79992-76-0). In various embodiments of the present invention the magnesium salt is magnesium bis(2-ethyl butyrate).

Additives may be incorporated into the polymer sheet to enhance its performance in a final product. Such additives include, but are not limited to, the following agents: antiblocking agents, plasticizers, dyes, pigments, stabilizers (e.g., ultraviolet stabilizers), antioxidants, flame retardants, IR absorbers, and combinations of the foregoing additives, and the like, as are known in the art.

In various embodiments of polymer sheets of the present invention, the polymer sheets can comprise 20 to 60, 25 to 60, 20 to 80, or 10 to 70 parts plasticizer per one hundred parts of resin (phr). Of course other quantities can be used as is appropriate for the particular application. In some embodiments, the plasticizer has a hydrocarbon segment of fewer than 20, fewer than 15, fewer than 12, or fewer than 10 carbon atoms.

The amount of plasticizer can be adjusted to affect the glass transition temperature ($T_g$) of the poly(vinyl butyral) sheet. In general, higher amounts of plasticizer are added to decrease the $T_g$. Poly(vinyl butyral) polymer sheets of the present invention can have a $T_g$ of, for example, 40° C. or less, 35° C. or less, 30° C. or less, 25° C. or less, 20° C. or less, and 15° C. or less.

Any suitable plasticizers can be added to the polymer resins of the present invention in order to form the polymer sheets. Plasticizers used in the polymer sheets of the present invention can include esters of a polybasic acid or a polyhydric alcohol, among others. Suitable plasticizers include, for example, triethylene glycol di-(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217, and mixtures and combinations of the foregoing. Other plasticizers that can be used are mixed adipates made from $C_4$ to $C_9$ alkyl alcohols and cyclo $C_4$ to $C_{10}$ alcohols, as disclosed in U.S. Pat. No. 5,013,779 and $C_6$ to $C_8$ adipate esters, such as hexyl adipate. In various embodiments, the plasticizer used is dihexyl adipate and/or triethylene glycol di-2 ethylhexanoate.

Any suitable method can be used to produce the polymer sheets of the present invention. Details of suitable processes for making poly(vinyl butyral) are known to those skilled in the art (see, for example, U.S. Pat. Nos. 2,282,057 and 2,282,026). In one embodiment, the solvent method described in Vinyl Acetal Polymers, in Encyclopedia of Polymer Science & Technology, 3$^{rd}$ edition, Volume 8, pages 381-399, by B. E.

Wade (2003) can be used. In another embodiment, the aqueous method described therein can be used. Poly(vinyl butyral) is commercially available in various forms from, for example, Solutia Inc., St. Louis, Mo. as Butvar™ resin.

The poly(vinyl butyral) polymer, plasticizer, and additives can be thermally processed and configured into sheet form according to methods known to those of ordinary skill in the art.

As used herein, "resin" refers to the polymeric (for example poly(vinyl butyral)) component that is removed from the mixture that results from the acid catalysis and subsequent neutralization of the polymeric precursors. Resin will generally have other components in addition to the polymer, for example poly(vinyl butyral), such as acetates, salts, and alcohols. As used herein, "melt" refers to a melted mixture of resin with a plasticizer and optionally other additives, for example, antiblocking agents.

One exemplary method of forming a poly(vinyl butyral) sheet comprises extruding molten poly(vinyl butyral) comprising resin, plasticizer, and additives—the melt—by forcing the melt through a sheet die (for example, a die having an opening that is substantially greater in one dimension than in a perpendicular dimension). Another exemplary method of forming a poly(vinyl butyral) sheet comprises casting a melt from a die onto a roller, solidifying the resin, and subsequently removing the solidified resin as a sheet.

Antiblocking agents of the present invention can be incorporated into polymer sheets by adding the agents to a melt and mixing the melt prior to formation of the polymer sheet. For embodiments in which an antiblocking region is formed in a polymer sheet, anti-blocking agents can be added to a first melt which is coextruded with a second melt, wherein the second melt has, for example, no antiblocking agent added. In other embodiments, a third melt comprising antiblocking agent can be coextruded as well to form the three region embodiment described elsewhere herein. The resulting sheets will have antiblocking regions and non antiblocking regions as described elsewhere herein.

Polymer Film

As used herein, a "polymer film" means a relatively thin and rigid polymer layer that functions as a performance enhancing layer. Polymer films differ from polymer sheets, as used herein, in that polymer films do not themselves provide the necessary impact resistance and glass retention properties to a multiple layer glazing structure, but rather provide performance improvements, such as infrared absorption character. Poly(ethylene terephthalate) is most commonly used as a polymer film.

Polymer films used in the present invention can be any suitable film that is sufficiently rigid to provide a relatively flat, stable surface, for example those polymer films conventionally used as a performance enhancing layer in multiple layer glass panels. The polymer film is preferably optically transparent (i.e. objects adjacent one side of the layer can be comfortably seen by the eye of a particular observer looking through the layer from the other side), and usually has a greater, in some embodiments significantly greater, tensile modulus regardless of composition than that of the adjacent polymer sheet. In various embodiments, the polymer film comprises a thermoplastic material. Among thermoplastic materials having suitable properties are nylons, polyurethanes, acrylics, polycarbonates, polyolefins such as polypropylene, cellulose acetates and triacetates, vinyl chloride polymers and copolymers and the like. In various embodiments, the polymer film comprises materials such as re-stretched thermoplastic films having the noted properties, which include polyesters. In various embodiments, the polymer film comprises or consists of poly(ethylene terephthalate), and, in various embodiments, the polyethylene terephthalate has been biaxially stretched to improve strength, and/or has been heat stabilized to provide low shrinkage characteristics when subjected to elevated temperatures (e.g. less than 2% shrinkage in both directions after 30 minutes at 150° C.).

In various embodiments, the polymer film can have a thickness of 0.013 millimeters to 0.20 millimeters, 0.025 millimeters to 0.1 millimeters, or 0.04 to 0.06 millimeters. The polymer film can optionally be surface treated or coated with a functional performance layer to improve one or more properties, such as adhesion or infrared radiation reflection. These functional performance layers include, for example, a multilayer stack for reflecting infra-red solar radiation and transmitting visible light when exposed to sunlight. This multilayer stack is known in the art (see, for example, WO 88/01230 and U.S. Pat. No. 4,799,745) and can comprise, for example, one or more Angstroms-thick metal layers and one or more (for example two) sequentially deposited, optically cooperating dielectric layers. As is also known (see, for example, U.S. Pat. Nos. 4,017,661 and 4,786,783), the metal layer(s) may optionally be electrically resistance heated for defrosting or defogging of any associated glass layers. Various coating and surface treatment techniques for poly(ethylene terephthalate) film and other polymer films that can be used with the present invention are disclosed in published European Application No. 0157030. Polymer films of the present invention can also include a hardcoat and/or and antifog layer, as are known in the art.

The present invention includes methods for preventing blocking in polymer sheets and polymer interlayers, comprising forming any of the polymer stack/polymer sheet constructs of the present invention, laminating the construct to form an interlayer, and, optionally, rolling or stacking the interlayer.

The present invention also includes methods for preventing blocking in polymer sheets, comprising forming a polymer sheet having any of the antiblocking regions/non antiblocking regions described herein, and, optionally, rolling or stacking the polymer sheet.

Also included in the present invention are stacks or rolls of any of the polymer interlayers of the present invention disclosed herein.

The present invention includes multiple layer glazing panels, and specifically multiple layer glass panels such as architectural safety glass and automobile windshields, comprising any of the interlayers of the present invention.

The present invention includes methods of manufacturing an interlayer, comprising using a coextrusion technique to form one or two antiblocking regions within a polymer sheet.

The present invention includes methods of manufacturing a multiple layer glass panel, comprising disposing any of the interlayers of the present invention, with or without additional polymeric layers, between two panes of glass and laminating the stack.

In addition to the embodiments given above, other embodiments comprise a rigid glazing substrate other than glass. In these embodiments, the rigid substrate can comprise acrylic, Plexiglass®, Lexan®, and other plastics, such as polycarbonate, that are conventionally used as glazings.

Various polymer sheet and/or laminated glass characteristics and measuring techniques will now be described for use with the present invention.

The clarity of a polymer sheet, and particularly a poly (vinyl butyral) sheet, can be determined by measuring the haze value, which is a quantification of light not transmitted through the sheet. The percent haze can be measured according to the following technique. An apparatus for measuring the amount of haze, a Hazemeter, Model D25, which is available from Hunter Associates (Reston, Va.), can be used in accordance with ASTM D1003-61 (Re-approved 1977)-Procedure A, using Illuminant C, at an observer angle of 2 degrees. In various embodiments of the present invention, percent haze is less than 5%, less than 3%, and less than 1%.

Pummel adhesion can be measured according to the following technique, and where "pummel" is referred to herein to quantify adhesion of a polymer sheet to glass, the following technique is used to determine pummel. Two-ply glass laminate samples are prepared with standard autoclave lamination conditions. The laminates are cooled to about −17° C. (0° F.) and manually pummeled with a hammer to break the glass. All broken glass that is not adhered to the poly(vinyl butyral) sheet is then removed, and the amount of glass left adhered to the poly(vinyl butyral) sheet is visually compared with a set of standards. The standards correspond to a scale in which varying degrees of glass remain adhered to the poly(vinyl butyral) sheet. In particular, at a pummel standard of zero, no glass is left adhered to the poly(vinyl butyral) sheet. At a pummel standard of 10, 100% of the glass remains adhered to the poly(vinyl butyral) sheet. For laminated glass panels of the present invention, various embodiments have a pummel of at least 3, at least 5, at least 8, at least 9, or 10. Other embodiments have a pummel between 8 and 10, inclusive.

The "yellowness index" of a polymer sheet can be measured according to the following: transparent molded disks of polymer sheet 1 cm thick, having smooth polymeric surfaces which are essentially plane and parallel, are formed. The index is measured according to ASTM method D 1925, "Standard Test Method for Yellowness Index of Plastics" from spectrophotometric light transmittance in the visible spectrum. Values are corrected to 1 cm thickness using measured specimen thickness. In various embodiments of the present invention, a polymer sheet can have a yellowness index of 12 or less, 10 or less, or 8 or less.

Blocking can be measured according to the following technique, and, as used and referred to herein, "blocking force" is determined using the following technique, which is a measure of "peel adhesion." Two rectangular filmstrips are cut and placed together in completely overlapping pairs. The top sheet of each pair is adhered to a piece of tape of a corresponding size. The film pairs are placed centrally between two steel plates and the assembly is subjected to 69 kilo Pascal pressure at a temperature range of about 7° C.-25° C. for 24 hours. The strips can then be peeled apart in a 90-degree peel test by a peel testing apparatus at a peel speed of 84 inches per minute. The blocking force is quantified in pounds per linear inch (PLI). In various embodiments, antiblocking agents of the present invention are incorporated into polymer sheets at a concentration sufficient to impart a blocking force of less than 2.5 pounds per linear foot (PLI), less than 2.25 PLI, less than 2.0 PLI, less than 1.75, PLI, less than 1.5 PLI, less than 1.25 PLI, less than 1.0 PLI, less than 0.8 PLI, less than 0.6 PLI, less than 0.5 PLI, less than 0.4 PLI, less than 0.3 PLI, less than 0.2 PLI, and less than 0.1 PLI. One of ordinary skill in the art, based upon the teachings of the disclosure, will readily be able to alter the production conditions given herein in order to produce polymer sheets of the present invention with the desired blocking force.

By virtue of the present invention, it is now possible to provide interlayers having superior antiblocking character without unacceptably impacting the optical qualities of a finished glazing product. Further, by limiting the antiblocking agents to relatively thin outer layers or antiblocking regions, less agent is required to achieve an equivalent effect to that achieved with conventional bulk antiblocking agent use.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout. For example, a polymer sheet can be formed comprising agents in any of the ranges given in addition to any of the ranges given for plasticizer, to form many permutations that are within the scope of the present invention.

Figures are understood to not be drawn to scale unless indicated otherwise.

Each reference, including journal articles, patents, applications, and books, referred to herein is hereby incorporated by reference in its entirety.

We claim:

1. A multiple layer interlayer comprising:
a first poly(vinyl butyral) layer having a concentration of about 0.01 to 0.6 wt. % of an antiblocking agent and having a thickness of less than 0.4 millimeters; and
a second poly(vinyl butyral) layer disposed in contact with the first poly(vinyl butyral) layer, wherein the second poly(vinyl butyral) layer has no added antiblocking agent,
wherein the interlayer has a haze value of less than 3%, and wherein the antiblocking agent is a fatty acid amide of the formula:

wherein R is a hydrocarbon chain having about 12 to about 40 carbon atoms, and $R_1$ or a hydrocarbon chain having 1 to about 40 carbon atoms and wherein the fatty acid amide is selected from the group consisting of erucamide, behenamide, oleyl palmitamide, stearyl erucamide, erucyl stearamide, hydroxystearamide, oleic acid diethanolamide, stearic acid diethanolamide, poly(ethylene glycol) oleic amide, stearamide, and mixtures of the foregoing amides.

2. The interlayer of claim 1, wherein the interlayer has a haze value of less than 1%.

3. The interlayer of claim 1, wherein the first poly(vinyl butyral) layer has a thickness of less than 0.25 millimeters.

4. The interlayer of claim 1, wherein the antiblocking agent comprises N-oleyl palmitamide.

5. The interlayer of claim 1, wherein the fatty acid amide is incorporated in the first poly(vinyl butyral) layer at a concentration of about 0.1 to about 0.3 wt %.

6. The interlayer of claim 1, further comprising a third poly(vinyl butyral) layer, wherein the second poly(vinyl butyral) layer is disposed between the first poly(vinyl butyral) layer and the third poly(vinyl butyral) layer, and wherein the third poly(vinyl butyral) layer has an antiblocking agent.

7. The interlayer of claim 1, wherein the interlayer has a pummel adhesion value of at least 3.

8. A multiple layer laminated glazing panel comprising:
a first poly(vinyl butyral) layer having a concentration of about 0.01 to 0.6 wt. % of an antiblocking agent and having a thickness of less than 0.4 millimeters; and
a second poly(vinyl butyral) layer disposed in contact with the first poly(vinyl butyral) layer, wherein the second poly(vinyl butyral) layer no added antiblocking agent,
wherein the interlayer has a haze value of less than 3%, and wherein the antiblocking agent is a fatty acid amide of the formula:

wherein R is a hydrocarbon chain having about 12 to about 40 carbon atoms, and $R_1$ or a hydrocarbon chain having 1 to about 40 carbon atoms and wherein the fatty acid amide is selected from the group consisting of erucamide, behenamide, oleyl palmitamide, stearyl erucamide, erucyl stearamide, hydroxystearamide, oleic acid diethanolamide, stearic acid diethanolamide, poly(ethylene glycol) oleic amide, stearamide, and mixtures of the foregoing amides.

9. The glazing panel of claim 8, wherein the interlayer has a haze value of less than 1%.

10. The glazing panel of claim 8, wherein the first poly(vinyl butyral) layer has a thickness of less than 0.25 millimeters.

11. The interlayer of claim 8, wherein the fatty acid amide is incorporated in the first poly(vinyl butyral) layer at a concentration of about 0.1 to about 0.3 wt %.

12. The glazing panel of claim 8, wherein the interlayer has a pummel adhesion value of at least 3.

13. A multiple layer interlayer comprising:
a first poly(vinyl butyral) layer having a concentration of about 0.01 to 0.6 wt. % of an antiblocking agent and having a thickness of less than 0.4 millimeters;
a second poly(vinyl butyral) layer disposed in contact with the first poly(vinyl butyral) layer, wherein the second poly(vinyl butyral) layer no added antiblocking agent; and
a third poly(vinyl butyral) layer disposed in contact with the second poly(vinyl butyral) layer having a concentration of about 0.01 to 0.3 wt. % of an antiblocking agent and having a thickness of less than 0.4 millimeters,
wherein the second poly(vinyl butyral) layer is between the first poly(vinyl butyral) layer and the third poly(vinyl butyral) layer,
and wherein the interlayer has a haze value of less than 3% and a pummel adhesion value of at least 3,
and wherein each antiblocking agent is a fatty acid amide of the formula:

wherein R is a hydrocarbon chain having about 12 to about 40 carbon atoms, and $R_1$ is H or a hydrocarbon chain having 1 to about 40 carbon atoms and wherein the fatty acid amide is selected from the group consisting of erucamide, behenamide, oleyl palmitamide, stearyl erucamide, erucyl stearamide, hydroxystearamide, oleic acid diethanolamide, stearic acid diethanolamide, poly(ethylene glycol) oleic amide, stearamide, and mixtures of the foregoing amides.

14. The interlayer of claim 13, wherein the antiblocking agent comprises N-oleyl palmitamide, and wherein the antiblocking agent incorporated in the first poly(vinyl butyral) layer and the third poly(vinyl butyral) layer at a concentration of about 0.1 to about 0.3 wt %.

* * * * *